Patented Nov. 30, 1926.

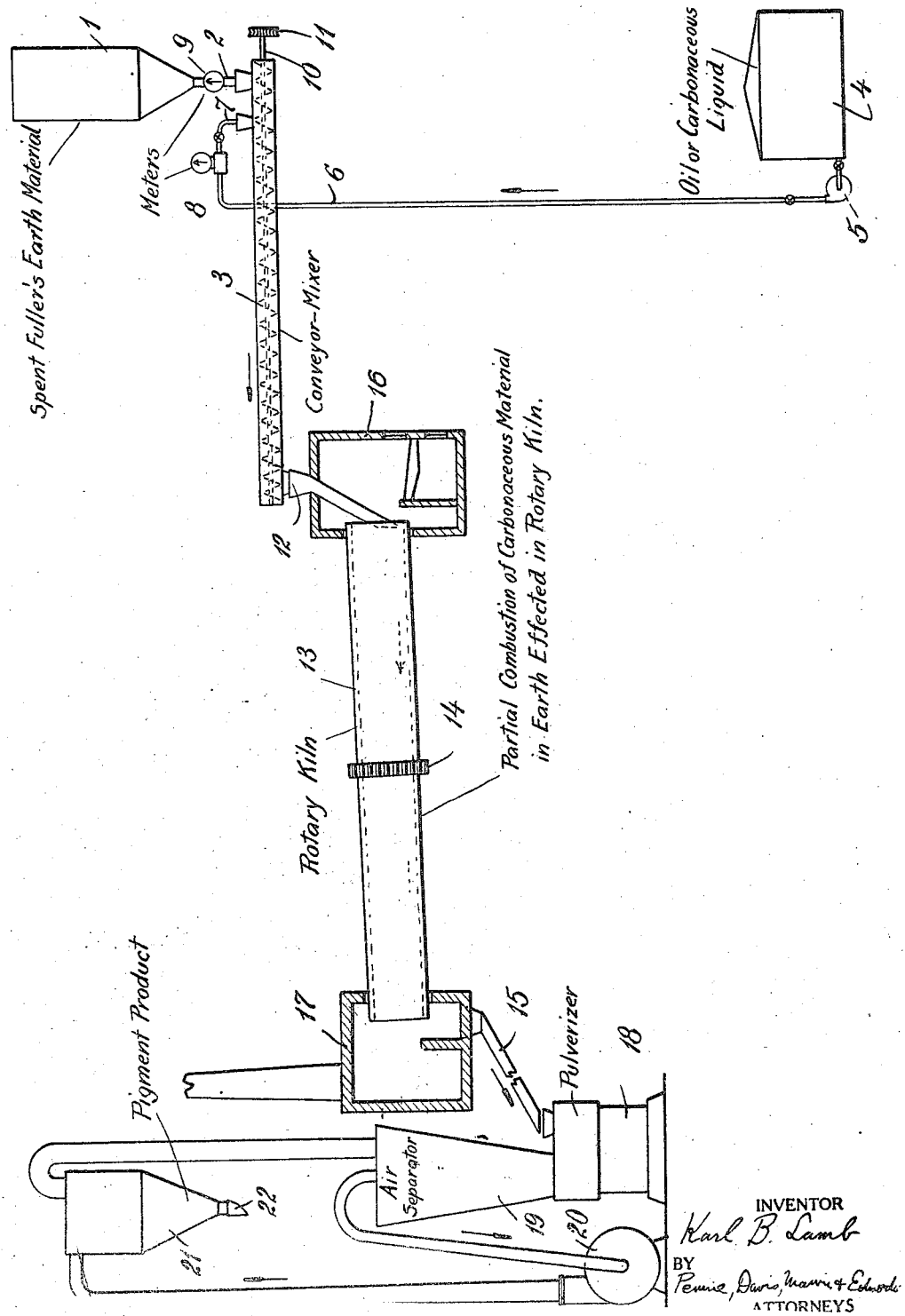

1,609,120

UNITED STATES PATENT OFFICE.

KARL BARRÉ LAMB, OF NEW YORK, N. Y.

MANUFACTURE OF PIGMENTS.

Application filed December 10, 1924. Serial No. 754,834.

This invention relates to an improved method of producing composite black pigments and pigment compositions. In Patent No. 1,424,729 granted on an application filed by me April 27, 1921 there is described an improved composite black pigment comprising fuller's earth and a relatively small percentage of carbon black intimately distributed throughout the fuller's earth. The present invention relates more particularly to an improved method of producing composite black pigments of this character.

Fuller's earth is commonly used in refining mineral, vegetable, and animal oils and fats. After a certain period of use, the fuller's earth loses its effectiveness and becomes what is commonly known as "spent". The spent fuller's earth, after draining of the readily separated oil or fat therefrom, still contains a considerable amount of the oily material admixed therewith, but this spent fuller's earth is commonly considered a waste product. The fuller's earth is porous and the oily material is intimately distributed through the earth. The spent earth is sometimes subjected to extraction processes for the recovery of an additional part of the oily material retained by the earth which will not readily drain off, and, although additional amounts of the oily material are separated from the earth in this way, the spent earth still contains a substantial amount of the oily material distributed through the finest pores of the earth.

According to the present invention, an additional amount of carbonaceous material, which on carbonization will leave a residue of carbon black, is intimately admixed with the spent fuller's earth and the mixture is then subjected to a carbonizing operation to decompose the carbonaceous material distributed through the fuller's earth and to form carbon black in a similar state of intimate admixture therewith. Following the carbonizing operation, the carbonized product may be disintegrated to the desired pigment fineness. Among the carbonaceous liquids, or semi-liquids, which may be employed in carrying out the present invention are fuel oils such as the low grade oils and cuts derived in refining petroleum, waste oils and greases and other carbonaceous materials which are thrown away as a waste product or marketed at a very low price such as oil drained from the crank cases of automobile engines and waste petroleum residues of various kinds, residues from sugar refineries, and waste liquors from paper mills.

In carrying out the present invention, accordingly, the carbon black content of the composite pigment may be increased by the use of inexpensive or otherwise waste products. The spent fuller's earth employed is commonly considered to have little, if any, value so that the improved pigment composition can be made at very low cost, while at the same time it has properties which adapts it to particular advantage for use for many purposes. The percentage of carbonaceous material in admixture with the fuller's earth submitted to the carbonizing operation and the percentage of carbon black in the composite pigment product may thus be regulated and standardized.

The process of the present invention is of special value as applied to spent fuller's earth which has been subjected to an extraction process for the recovery of part of the oil absorbed in the spent earth. Valuable constituents may thus be recovered from the spent earth and replaced, before the spent earth and admixed carbonaceous material are subjected to the carbonizing operation, with some relatively inexpensive or otherwise waste carbonaceous material. At the same time, the unextracted part of the oily material originally present in the spent earth is apparently that part distributed through the finest pores of the earth so that an improved product is obtained by the addition of additional carbonaceous material and upon carbonization of the mixture including this added carbonaceous material and the unseparated oily material. For example, in refining linseed oil with fuller's earth, the spent earth may be subjected to extraction with gasoline to recover all but about 5% of the absorbed oily material and the oil separated by the extraction can be replaced with some cheaper carbonaceous material without detriment to the quality of the pigment product.

The product of the carbonizing operation consists of fuller's earth with carbon black intimately distributed throughout the pores and upon the particles of the fuller's earth. The porous earth apparently is intimately coated or plated with the deposited carbon black. Following the carbonizing operation, the carbonized product may be pulverized and a pigment product of the desired fineness separated from the pulverized material. This separation may with advantage be effected by air flotation. Coarser material than that desired may be returned to the pulverizing operation for further subdivision therein.

The accompanying drawing conventionally illustrates an apparatus adapted for carrying out the process of the present invention. This drawing also diagrammatically represents one way of carrying out the improved process of the invention.

In carrying out the process of the invention in the apparatus illustrated, spent fuller's earth from the bin 1 is discharged through the chutes 2 into one end of the conveyor-mixer 3. This spent fuller's earth may be waste earth which has been employed in refining vegetable oils, such as cottonseed oil or linseed oil, or mineral oils and distillates, or animal oils and fats such as lard. The earth may or may not have been subjected to an extraction process for the separation of part of its absorbed oil or wax content. A carbonaceous liquid, such as waste oil or grease, is pumped from the tank 4 by means of pump 5 through connection 6 and is also discharged into the same end of the conveyor-mixer 3 through the connection 7. Meters 8 and 9 are arranged in the connection 7 and in the chute 2 respectively for controlling the relative proportions of spent fuller's earth and oil employed.

The conveyor-mixer 3 comprises a casing with a helical blade arranged therein on a shaft 10 which is driven through gear 11 so as to propel oil and spent fuller's earth introduced through connection 7 and chute 2 to the other end of the conveyor-mixer where they are discharged through the chute 12. In passage through the conveyor-mixer 3 the spent fuller's earth and the added carbonaceous liquid are intimately and thoroughly admixed. While the conveyor-mixer illustrated is particularly advantageous for effecting the distribution of the added carbonaceous liquid through the spent earth it will be apparent that other mixing apparatus may be employed for effecting this intermixture and distribution. The intermixture of spent earth and added carbonaceous liquid may be further promoted by initially introducing the added oil or other carbonaceous liquid into the earth in the form of a spray.

The admixed spent fuller's earth and added carbonaceous liquid are discharged from the conveyor-mixer through the chute 12 into the upper end of a rotary kiln 13. This rotary kiln is arranged to be driven through a gear 14 so that the earth and admixed carbonaceous material are progressively moved downwardly through the kiln to the lower end where they are discharged through the chute 15. A furnace 16 is arranged at the upper end of the kiln from which the hot combustion gases flow through the kiln to the stack chamber 17 at the lower end. As the earth and admixed carbonaceous material progress through the kiln, the mass is continuously stirred and carbonization of the carbonaceous material proceeds, the earth becoming black in color until the product as a whole becomes an intense black. The carbonization operation is carried out at a relatively low temperature, just sufficient to decompose the absorbed and admixed carbonaceous material, and the air supplied may also be restricted to prevent excessive oxidation. In the continuous operation of the process in a kiln of the character illustrated, after the carbonization operation is started it may itself supply a substantial part of the heat required so that the amount of external heat needed may be materially reduced, or in some cases eliminated. In the apparatus illustrated, the furnace is arranged at the charging end of the kiln which arrangement has the advantage of heating the earth mixture to the carbonizing temperature as it enters the kiln so that the burning of the earth mixture as it passes through the kiln may supply a large part of the heat required. The furnace and stack chamber may be reversed, however, and the operation carried out with flow of the combustion gases, from the furnace and from the earth mixture burning in the lower part of the kiln, in countercurrent to the earth mixture traveling down the kiln from the upper end. The carbonizing operation may be carried out with direct heating of the admixed earth and carbonaceous material, as in the apparatus illustrated, or heat may be supplied externally to a carbonizing retort.

The carbonized product discharged through the chute 15 is conducted to suitable disintegrating or pulverizing equipment. The carbonized product from the kiln may be cooled before it is introduced into the disintegrating or pulverizing apparatus. In the apparatus illustrated, the carbonized product is introduced into an impact pulverizer 18. It will be apparent that a ball-mill or pebble-mill or other suitable pulverizing equipment may be employed in place of the type of pulverizer shown. The disintegrated product from the pulverizer is discharged into an air flotation separator 19 where the product of the required degree of fineness is withdrawn by the fan 20 and discharged into the bin 21. From the bin 21, the finished composite black pigment product is discharged through the chute 22, whence it may be conducted to suitable bag filling or barrel filling or other packaging machinery. The coarser material is returned from the air flotation separator 19 to the pulverizer 18 where it is subjected to further disintegration.

In addition to the composite pigment product, lamp black can be simultaneously produced and recovered from the "smoke" given off during the carbonizing operation. For example the gases containing suspended carbon black which are discharged into the stack chamber 17 may be passed through suitable recovery apparatus, such as an electric precipitator, for the separation of the suspended carbon black. This smoke may be treated for the precipitation and recovery of carbon black therefrom in much the same way as lampblack is recovered when made from oil. The lampblack thus separately recovered is itself a valuable product and may be separately employed in place of lampblack made from other sources, or it can advantageously be combined with the composite black pigment produced in carrying out the invention, thus increasing the content of lampblack in the composite pigment. A certain amount of lampblack from the smoke may be precipitated in the earth within the kiln during the carbonizing operation.

The composite black pigment product produced in carrying out the invention is of the general character of the product described in the said Patent No. 1,424,729 although it may contain a somewhat greater percentage of carbon black. This pigment product is adapted for use for many of the purposes where lampblack and compositions containing lampblack are now used, and its use is particularly advantageous where a composite pigment material containing both a filler or body giving material and a black pigment is required. Although the percentage of carbon black present in the pigment product produced in carrying out the invention may be relatively small, the carbon black and the earth are so intimately associated with each other that although a relatively large amount of the earth, a filler, is present, the composite pigment product nevertheless has the desired black properties. The intensity of the black color, particularly as compared to the percentage of carbon black present, is apparently due to the peculiar characteristics of the fuller's earth and to the extremely intimate distribution of the carbon black through the earth.

The terms "low grade" and "lower grade" as used in the appended claims are used to define waste materials or materials having a very low market price as compared with the market price of the oil which has been decolored or purified by the spent fuller's earth.

I claim:

1. A method of producing a composite black pigment, which comprises intimately admixing a low grade carbonaceous liquid with spent fuller's earth, subjecting the mixture to a carbonizing operation, and disintegrating the carbonized product to pigment fineness.

2. A method of producing a composite black pigment, which comprises intimately admixing a low grade hydrocarbon material with spent fuller's earth, subjecting the mixture to a carbonizing operation, and disintegrating the carbonized product to pigment fineness.

3. A method of producing a composite black pigment, which comprises intimately admixing a low grade oil with spent fuller's earth, subjecting the mixture to a carbonizing operation, and disintegrating the carbonized product to pigment fineness.

4. A method of producing a composite black pigment, which comprises intimately admixing a low grade carbonaceous liquid with extracted spent fuller's earth, subjecting the mixture to a carbonizing operation, and disintegrating the carbonized product to pigment fineness.

5. A method of producing a composite black pigment, which comprises intimately admixing a low grade carbonaceous liquid with spent fuller's earth and subjecting the mixture to a carbonizing operation.

6. A method of producing a composite black pigment, which comprises intimately admixing a low grade carbonaceous liquid with extracted spent fuller's earth and subjecting the mixture to a carbonizing operation.

7. A method of producing a composite black pigment, which comprises intimately admixing a low grade carbonaceous liquid with spent fuller's earth and subjecting the mixture to a carbonizing operation, supplying part at least of the heat for carbonization from the burning of the earth mixture.

8. A method of producing a composite black pigment which comprises extracting purified oil from spent fuller's earth, admixing low grade carbonaceous material with the extracted fuller's earth, subjecting the mixture to a carbonizing operation, and disintegrating the carbonized product to pigment fineness.

9. A method of producing a composite black pigment which comprises extracting purified oil from spent fuller's earth, admixing a low grade hydrocarbon material with the extracted fuller's earth, subjecting the mixture to a carbonizing operation, and disintegrating the carbonized product to pigment fineness.

10. A method of producing a composite pigment which comprises extracting purified oil from spent fuller's earth, admixing a waste carbonaceous liquid with the extracted fuller's earth, subjecting the mixture to a carbonizing operation, and disintegrating the carbonized product to pigment fineness.

11. A method of producing a composite black pigment which comprises extracting purified oil from spent fuller's earth, admixing a hydrocarbon oil of a lower grade than the purified oil with the extracted fuller's earth, subjecting the mixture to a carbonizing operation, and disintegrating the carbonized product to pigment fineness.

12. A method of producing a composite black pigment which comprises extracting purified oil from spent fuller's earth, admixing a waste hydrocarbon oil with the extracted fuller's earth, subjecting the mixture to a carbonizing operation, and disintegrating the carbonized product to pigment fineness.

13. A method of producing a composite black pigment which comprises extracting purified oil from spent fuller's earth, admixing a low grade lubricating oil with the extracted fuller's earth, subjecting the mixture to a carbonizing operation, and disintegrating the carbonized product to pigment fineness.

14. A method of producing a composite black pigment which comprises extracting purified oil from spent fuller's earth, admixing a waste lubricating oil with the extracted fuller's earth, subjecting the mixture to a carbonizing operation, and disintegrating the carbonized product to pigment fineness.

15. A method of producing a composite black pigment, which comprises intimately admixing a low grade lubricating oil with spent fuller's earth, subjecting the mixture to a carbonizing operation, and disintegrating the carbonized product to pigment fineness.

16. A method of producing a composite black pigment, which comprises intimately admixing a low grade carbonaceous material with spent fuller's earth, subjecting the mixture to a carbonizing operation, and disintegrating the carbonized product to pigment fineness.

17. A method of producing a composite black pigment, which comprises intimately admixing a waste hydrocarbon liquid with spent fuller's earth, subjecting the mixture to a carbonizing operation; and disintegrating the carbonized product to pigment fineness.

18. A method of producing a composite black pigment, which comprises intimately admixing a waste carbonaceous liquid with spent fuller's earth, subjecting the mixture to a carbonizing operation, and disintegrating the carbonized product to pigment fineness.

19. A method of producing a composite black pigment, which comprises intimately admixing a waste oil with spent fuller's earth, subjecting the mixture to a carbonizing operation, and disintegrating the carbonized product to pigment fineness.

In testimony whereof I affix my signature.

KARL BARRÉ LAMB.